Patented Oct. 4, 1949

2,483,634

UNITED STATES PATENT OFFICE 2,483,634

WATER-SOLUBLE PRODUCTS RECOVERED FROM FORAGE CROPS

William R. Graham, Jr., Kansas City, and George O. Kohler, Mission, Kans., and Elroy E. Frye, Kansas City, Mo., assignors to American Dairies, Incorporated, Kansas City, Mo., a corporation of Maryland, and The Quaker Oats Company, Chicago, Ill., a corporation of New Jersey, jointly No Drawing. Original application February 8, 1944, Serial No. 521,572. Divided and this application January 11, 1945, Serial No. 572,438

9 Claims. (Cl. 99—28)

Our invention relates to water-soluble products recovered from forage crops, particularly, the natural juices and water extracts of leafy vegetation and refers more particularly to the alteration of such products to render them more palatable and appetizing for human consumption.

This application is a division of a copending application identified as Serial No. 521,572, filed February 8, 1944.

A vegetation high in vitamin content should be selected in order that the product be healthful as well as palatable. We prefer to use the so-called forage crops, such as grass, alfalfa and clover, since they have an especially high nutritional value. These crops contain many of the vitamin factors in large quantities and are a valuable food source. Although widely used for feeding livestock, they are so bitter and unpalatable that they have not been generally included as a part of the human diet. However, except for the fact that they are unpalatable, these materials would provide an excellent human food, either as harvested or in the form of extracts.

An important object of our invention is to enhance the palatability of vegetable juices or water extracts thereof without materially reducing the vitamin content.

Another object of our invention is to provide a method of dehydrating or drying the juices or water extract without material vitamin loss.

Still another object of our invention is to provide a concentrated or dehydrated product that is palatable and produces a tasty liquid when in aqueous solution.

A further object of our invention is to provide a product that has a pleasant taste and can be added to other foods to supplement their vitamin content.

The natural juices of the fresh vegetation are obtained by crushing and disintegrating the cellular structure of the leaves and expressing the juice from the pulp. Substantially all of the water soluble constituents of the leaves are recovered with the juice. These constituents include a great many nutritive factors including the water soluble vitamins.

When it is impractical to treat the vegetation near the place where it is grown and harvested it may be dried and shipped to a suitable processing plant. The leafy material may either be sun-dried in the field or artificially dried in a dehydrating unit. In the processing plant the water soluble constituents are obtained from the dried material by extraction with water or any polar organic solvent.

In this regard we prefer to use a solvent from which the dissolved oxygen has been removed although this is not essential to the success of the operation. Conventional methods of extraction may be used as most of the values contained in the material go into solution rapidly. The water extracts may be reduced to a powder either directly or after concentration by known drying procedures.

It is known that the nutritive constituents of plants can be extracted without serious vitamin loss, and between 90% to 100% of these factors have been recovered. An excellent extraction results when the plant is steeped in either hot or cold water for 15 minutes. The extract solution is relatively stable but is objectionable in the same respects as the original plant material. It is so unpalatable as to be practically valueless as a human food. It is bitter when tasted alone and imparts a bitter taste to other foods when added thereto in amounts sufficient to satisfactorily fortify its vitamin content.

The fat soluble vitamins and other nutritive constituents soluble in fat solvents remain to a great extent in the residue pulp of the fresh or dried material and can be extracted by any known method. However, this invention has to do only with the treatment of the natural juices or water extracts of the leaves and is in no way concerned with the recovery of the fat soluble constituents which may be removed either before or after the water extraction.

We have discovered that the disagreeable tastes in the water solubles from the leafy material is due primarily to the presence of soluble metallic salts or cations. These extracts are treated by passing them through a cation exchanger which removes the undesirable cations from the solution. The process of cation exchange removes only minor proportions of those vitamins which are of greatest value in the extract. The resulting extract while highly acid is markedly improved in flavor, having lost its metallic after taste. Product solutions from the cation exchanger have a pH ranging from 1.5 to 2.5. These solutions cannot be concentrated to any appreciable extent without objectionable vitamin loss due to the presence of highly reactive inorganic acids such as hydrochloric, nitric and sulfuric.

Attempts have been made to remove these objectionable acids by processes of anion exchange. While such processes remove the acids and produce a relatively neutral sweet solution the vitamin content is substantially impaired and only minor amounts of these valuable food substances remain. Although it is possible to remove and concentrate the vitamins from the anion exchanger, and such procedure is here contemplated, it is not to be considered as an essential part of the instant invention.

Both cations and anions may be removed from the extracts or juices more effectively and satisfactorily by electrodialysis. Difficulties may be anticipated in electrodializing juices as contrasted with the water extracts since the juices contain a considerable amount of protein or other colloidal material. These contaminants should be first removed by heat precipitation or otherwise to permit a greater freedom of flow through the dializing membranes. This difficulty is not experienced to any appreciable extent in dializing water extracts where proteinaceous and colloidal contaminants are not present.

Electrodialysis of the extracts optionally precedes ion exchange since this process removes both anions and cations. In fact, the pH values shown in successive aliquots taken from the extract during dialyzation indicate that the transport numbers of the cations present are lower than that of the anions causing a decrease in the pH. The inorganic acids as reflected by one type of anion and a considerable proportion of the cations are removed in a short period of electrodialysis considerably improving the palatability of the extract. The product solution may be concentrated and/or dried after removal of the inorganic acids in this manner.

The taste of the product is dependent to a large extent either upon the pH or the nature of the salts present. These may be altered in several ways. The electrodialized solutions may be cation exchanged to remove the remaining metallic ions present. The extract so treated may then be neutralized to the desired extent, with a suitable cation such as calcium, tin, lead or magnesium, which combine with the organic acids to form salts of low solubilities. The salts remove a considerable proportion of the organic acids from the solution and after precipitation are filtered therefrom. The metallic ions remaining can be removed by repassing the solution over a cation exchanger. Should the cations be toxic as in the case of lead, this procedure is essential. The organic acids remaining in the extract after these procedures are optionally neutralized with sodium or other cations of a palatable nature, depending on the character of the final product desired.

The pH of extracts which have been only cation exchanged may be adjusted by the addition of metallic ions as described above.

In carrying out our process for the preparation of a palatable beverage from forage crops, the following typical procedure has been used for the preparation of a suitable water extract. Immature oat grass was harvested and immediately dehydrated by a flash process in a rotating triple-pass drum drier (Ardrier). The dehydrated grass was ground to pass a 60 mesh screen in a hammer mill. The powdered material was bright green in color and had the typical bitter metallic taste. 500 mg. of this material was steeped for 15 minutes in 1500 ml. of boiling water. The water had been preboiled to expell dissolved oxygen. The slurry was filtered in a Buchner funnel to remove the insoluble material. The water-insoluble material was washed continuously with boiling water until the combined extract and washings totaled 2500 ml. This water extract which was dark brown in color had the bitter metallic taste of the original grass and will be referred to as a crude water extract.

A preliminary fat-solvent extraction of the grass for recovery of the fat soluble vitamins and chlorophyll had no appreciable effect on the taste or composition of the water extract. In either case substantially all of the water soluble vitamins were recovered in the water extract if proper precautions were taken to avoid contamination with copper which has a deleterious effect on ascorbic acid.

The crude water extract of forage crop prepared as described was then treated according to one of the following procedures for the purpose of rendering it palatable. The choice of procedure will depend upon the use for which the material is intended.

(1) The aqueous extract was passed through a bed of cation exchanger material commercially sold as Amberlite IR-100 or Deacidite. In our laboratory work the ion exchanger consisted of a 3-foot length of 2-inch glass pipe held in a vertical position by means of clamps. The inlet and outlet tubes at the top and bottom of the column were set in rubber stoppers and were covered on the inside by a thin mat of glass wool. This glass wool supported a 2-inch layer of glass beads and quartz sand which in turn supported the 10-inch column of Amberlite IR-100. At the start of the run the water level in the column was adjusted to one inch above the top of the Amberlite bed. The clear brown, bitter-tasting aqueous extract was introduced into the top of the column, passed through the Amberlite and was removed from the bottom of the column by means of a glass tube fitted with a stopcock. The level of the liquid in the column was maintained constant by adjusting the inflow and discharge rate of flow. The "breaking point" of the column was determined by measuring the pH of successive aliquots of the product. The first 330 ml. of discharge was discarded since this was largely water which had been covering the column at the start of the run. The next 1100 ml. of solution had a pH of 1.5 to 2.5 (100 ml. aliquots). The pH of the effluent then arose to the original pH of the solution indicating that the Amberlite was saturated with cations. The 1100 ml. of acid product was much lighter in color than the original extract and had a somewhat milky appearance due to the formation of a precipitate in the column. This precipitate was removed by heating the product with a small amount of Bentonite and filtering. The resultant clear yellow solution was found to have a very sour taste. When it was diluted with an equal volume of water and a little sugar was added, a pleasant citrus-like flavor resulted.

The cation-saturated Amberlite was blackwashed and regenerated with acid according to the procedure recommended by the manufacturers, and was then ready for another run.

(2) 100 ml. of crude water was placed in the center cell of a water-cooled, three compartment Loddesol electrodialysis unit. Distilled water was placed in the anode and cathode compartments. Vegetable parchment was used as the cathode membrane while cellophane was used as the anode membrane. A current of 0.5 ampere was passed through the solution. The voltage drop across the unit was 15 volts. As the electrodialysis proceeded, the electrical resistance increased due to the removal of salts from the solution. After a three hour period the cation removal was practically complete, the amperage and voltage having changed to .11 ampere and 120 volts respectively. Ion removal was measured by titration of aliquots of the contents of the anode and cathode compartments. After a three hour run the pH of the product in the center compartment had dropped from pH-5.8 of the original to pH-2.6. This pH drop was partially due to the nature of the membranes but mostly to a combination of the low degree of ionization and the low ionic mobilities of the organic acids. Since the salts of inorganic anions are highly dissociated and since these anions have relatively high mobilities, they are preferentially removed as compared with the organic anions. This removal of inorganic anions is the important factor in producing a palatable product since the presence of the strong acids such as nitric and/or hydrochloric tends to give excess acidity and sharpness of taste. The electrodialized extract is therefore somewhat more bland in flavor than the cation exchanged product obtained from the first example.

(3) The procedures described in the examples given produce liquids suitable for human consumption. For some purposes it may be desirable to produce a concentrated or desiccated product suitable for incorporation in and enrichment of foods. A procedure adaptable to the production of such material follows: Crude extract is treated with a suspension of slaked lime to bring the pH to approximately 6.2. The mixture is heated to 80° C. and filtered. 100 ml. of the clear dark filtrate was electrodialyzed (see Example 2) for one hour to remove the bulk of the inorganic anions. The mildly acid solution (pH 4.2) was treated with .25 gm. of zinc dust at the boiling point for 2 minutes. This treatment brought about a marked reduction in color of the extract. The solution was then cooled and filtered. The filtrate was passed through the cation exchanger (see Example 1) to remove the zinc and the remaining naturally occurring cations of the grass extract. The solution was then partially neutralized to pH-3.3 with sodium hydroxide and evaporated in vacuo to a solids concentration of about 20%. The solution was then brought to a pH of approximately 5.0 by the addition of sodium hydroxide. The product at this stage was a fairly light colored neutral tasting liquid. The process was repeated until enough of the concentrated extract was obtained for drying in a small laboratory spray drier. The dehydrated product was a light colored impalpable powder. The chief unpleasant characteristic taste of forage crops had been eliminated and the product could be mixed with a wide variety of foodstuffs without detriment to their flavor.

Having thus described our invention we claim:

1. A palatable beverage comprising an aqueous extract of leafy vegetation containing water-soluble constituents of said crop but containing only traces of the unpalatable inorganic anions commonly present.

2. A palatable beverage comprising an aqueous extract of a forage crop such as grass, clover or alfalfa containing all of the water-soluble constituents of said crop but containing only traces of the naturally occurring metallic ions.

3. A palatable beverage comprising an aqueous extract of leafy vegetation having a pH in the order of 3.5 and containing the water-soluble constituents of the plants but containing only traces of the naturally occurring metallic ions and inorganic acids.

4. A palatable and highly nutritive food material comprising the dehydrated water-soluble constituents of a forage crop such as grass or clover but containing only traces of naturally occurring metallic ions and inorganic acids.

5. An aqueous extract of forage crops of the class of grass, clover and alfalfa, containing only traces of inorganic acids and metallic ions.

6. An aqueous extract of forage crops of the class of grass, clover and alfalfa having a pH of the order of 3.5, containing only traces of inorganic acids and metallic ions.

7. A palatable beverage comprising an aqueous extract of a leafy vegetation containing substantially all of the organic nutrients of said crop, but containing only traces of unpalatable inorganic anions commonly present in large amounts in such extracts.

8. A palatable beverage as in claim 7 having a pH of the order of 3.5.

9. A palatable beverage comprising an aqueous extract of forage crops of the class of grass, clover and alfalfa containing substantially all of the organic nutrients of said crop, but containing only traces of unpalatable inorganic anions commonly present in large amounts in such extracts.

WILLIAM R. GRAHAM, JR.
GEORGE O. KOHLER.
ELROY E. FRYE.

REFERENCES CITED

The following references are of record in the file of this patent:

UNITED STATES PATENTS

| Number | Name | Date |
|---|---|---|
| 2,133,362 | Schnabel | Oct. 18, 1938 |
| 2,190,176 | Smith | Feb. 13, 1940 |

FOREIGN PATENTS

| Number | Country | Date |
|---|---|---|
| 511,525 | Great Britain | 1939 |